US012500057B2

(12) United States Patent
Jozwiak et al.

(10) Patent No.: US 12,500,057 B2
(45) Date of Patent: Dec. 16, 2025

(54) UNSEALED SINGLE FUSE HOLDER

(71) Applicant: Littelfuse, Inc., Chicago, IL (US)

(72) Inventors: Andrew Jozwiak, San Antonio, TX (US); Jesus Roberto Morales, Juarez (MX)

(73) Assignee: Littelfuse, Inc., Rosemont, IL (US)

(*) Notice: Subject to any disclaimer, the term of this patent is extended or adjusted under 35 U.S.C. 154(b) by 200 days.

(21) Appl. No.: 18/370,978

(22) Filed: Sep. 21, 2023

(65) Prior Publication Data

US 2024/0087832 A1 Mar. 14, 2024

Related U.S. Application Data

(63) Continuation of application No. 17/942,575, filed on Sep. 12, 2022, now Pat. No. 11,817,284.

(51) Int. Cl.
*H01H 85/20* (2006.01)
*H01H 85/22* (2006.01)

(52) U.S. Cl.
CPC ... *H01H 85/205* (2013.01); *H01H 2085/2055* (2013.01); *H01H 2085/2075* (2013.01); *H01H 85/22* (2013.01)

(58) Field of Classification Search
CPC ................. H01H 85/205; H01H 85/22; H01H 2085/2055; H01H 2085/2065-209; H01H 85/2035; H01H 85/25; H01H 85/2045
See application file for complete search history.

(56) References Cited

U.S. PATENT DOCUMENTS

| | | | | |
|---|---|---|---|---|
| 4,171,862 A * | 10/1979 | Krasser | H01H 71/0271 361/823 |
| 4,767,339 A * | 8/1988 | Comerci | H01H 85/202 439/716 |
| 5,167,541 A | 12/1992 | Alves | |
| 2012/0019344 A1 | 1/2012 | Darr | |
| 2017/0345604 A1 | 11/2017 | Shah | |
| 2018/0159251 A1* | 6/2018 | Hai | H01R 9/2408 |

FOREIGN PATENT DOCUMENTS

| | | |
|---|---|---|
| EP | 4044209 A2 | 8/2022 |
| FR | 2996353 A1 | 4/2014 |

OTHER PUBLICATIONS

Extended European Search Report for EP Application No. 23195643.4, dated Apr. 29, 2024, 12 pages.
European Search Report for EP Allication No. 23195643.4, dated Feb. 8, 2024, 11 pages.

* cited by examiner

*Primary Examiner* — Jacob R Crum
(74) *Attorney, Agent, or Firm* — KDW Firm PLLC

(57) ABSTRACT

A fuse holder includes a movable tab, a base, and a cover. A stud is affixed to the movable tab and secures a terminal of a bolt-down fuse. A second stud is affixed to the base and secures a second terminal of the bolt-down fuse. The base has a channel into which the movable tab is slidably inserted. The cover connects to the base and is located over the stud and the second stud.

10 Claims, 14 Drawing Sheets

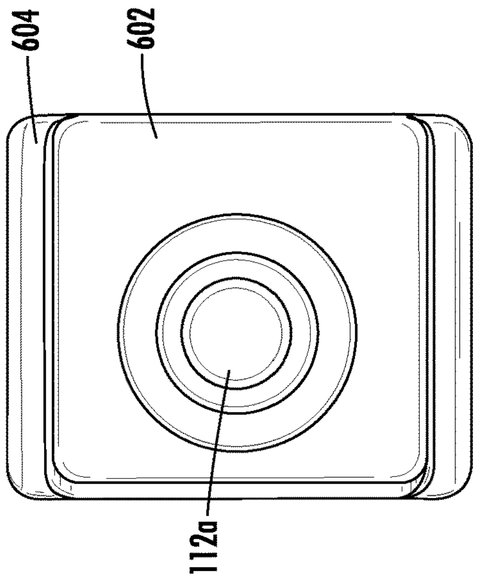
FIG. 6B
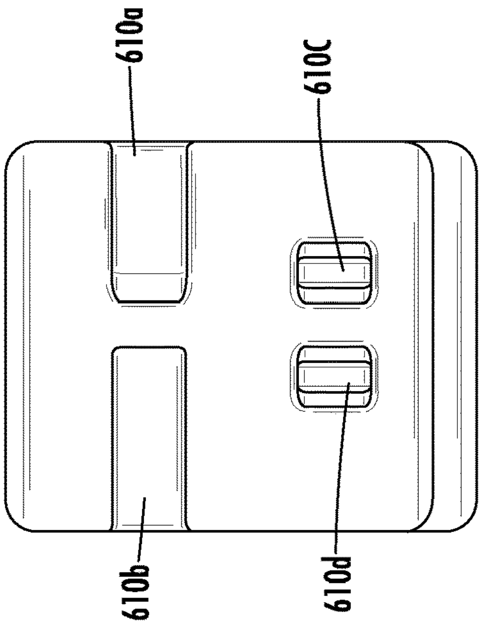
FIG. 6D
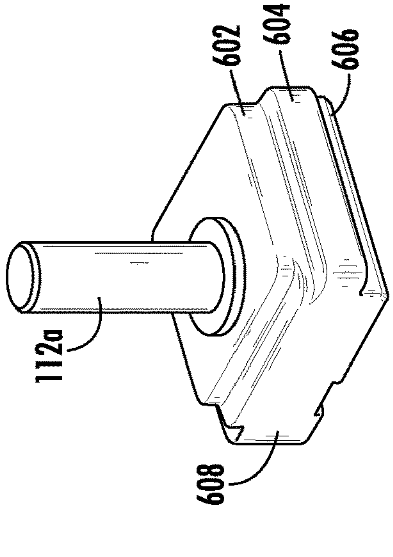
FIG. 6A
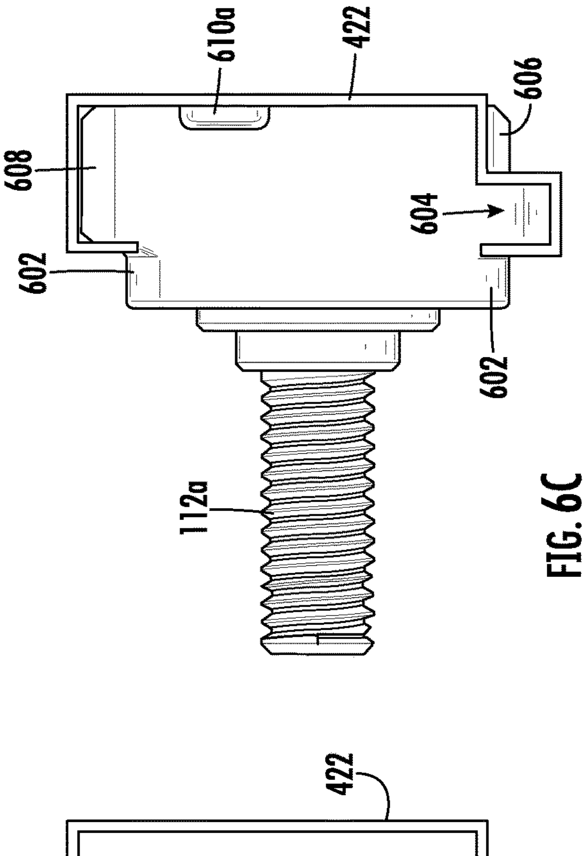
FIG. 6C
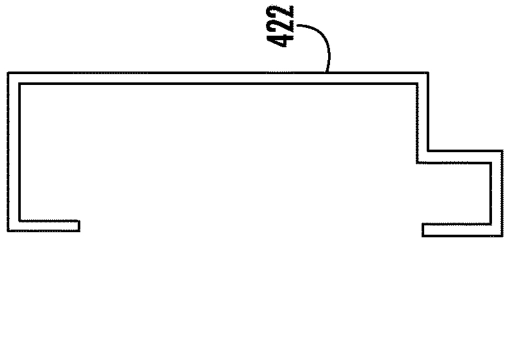

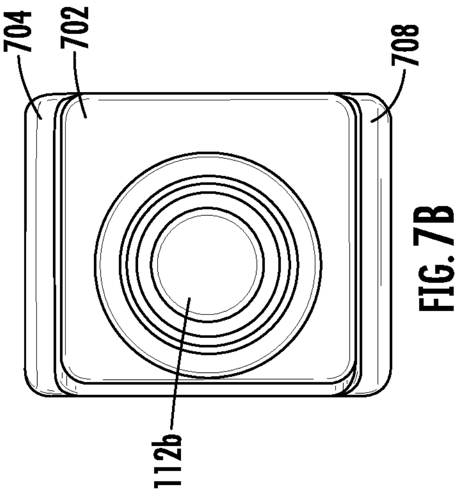
FIG. 7B
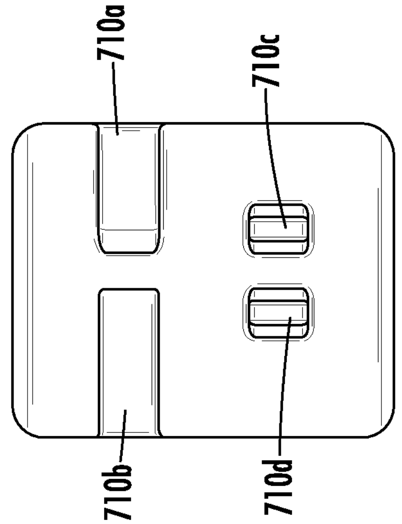
FIG. 7D
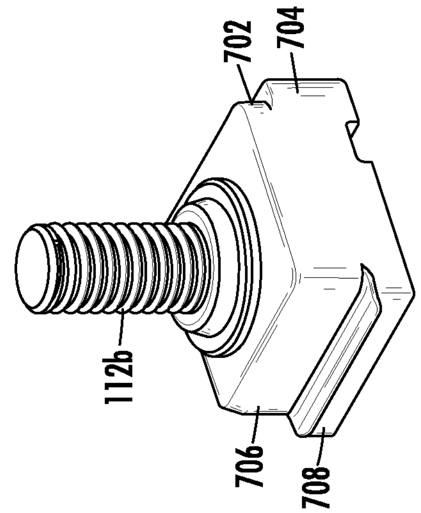
FIG. 7A
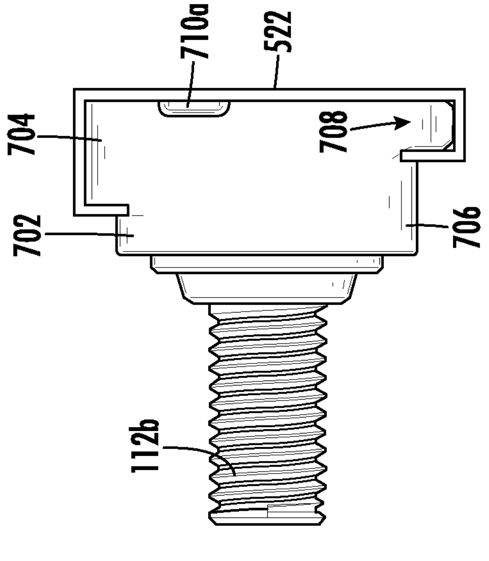
FIG. 7C
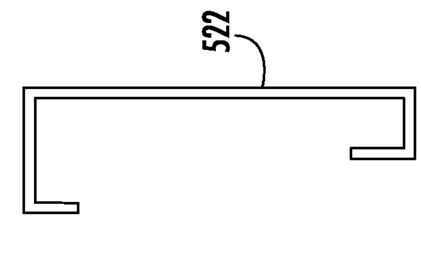

UNSEALED SINGLE FUSE HOLDER

RELATED APPLICATIONS

This application claims priority to U.S. patent application Ser. No. 17/942,575, entitled, UNSEALED SINGLE FUSE HOLDER, which was filed on Sep. 12, 2022 and is incorporated by reference herein in its entirety.

FIELD OF THE DISCLOSURE

Embodiments of the present disclosure relate to fuse holders and, more particularly, to a fuse holder for linear bolt-down fuses.

BACKGROUND

Linear bolt-down fuses are characterized as having a fuse housing disposed between two terminals, with the fuse housing and the two terminals being lined up with one another. The terminals each have apertures for receiving a stud. Typically secured with a nut, each stud attaches the terminal to either a cable (via a ring terminal) or to a busbar. A fuse within the fuse housing is thus electrically connected between two cables, a cable and a busbar, or two busbars.

Often, multiple bolt-down fuses may be used, such as inside a vehicle. With each bolt-down fuse being coupled to two cables, the cabling may become tangled or multiple cables may need to be zip-tied together. Some of the bolt-down fuses may be attached to a busbar at one end, but the busbar may not have enough apertures to accept all the bolt-down fuses. Although the fuse housing protects the fuse therein, the external studs and terminals may be exposed to elements or risk being shorted with other circuit elements. Further, the ends of the bolt-down fuse need to be supported to not flex the fuse terminals and fuse element inside the housing.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a fuse holder in accordance with the present disclosure may include a movable tab, a base, and a cover. A stud is affixed to the movable tab and secures a terminal of a bolt-down fuse. A second stud is affixed to the base and secures a second terminal of the bolt-down fuse. The base has a channel into which the movable tab is slidably inserted. The cover connects to the base and is located over the stud and the second stud.

An exemplary embodiment of a fuse holder assembly in accordance with the present disclosure may include a first fuse holder and a second fuse holder. The first fuse holder has a movable tab with a stud and a base. The base has a channel for receiving the movable tab and a pair of dovetail connectors located on a first side of the base. The second fuse holder also has a movable tab with a stud and a base. The base of the second fuse holder has a channel for receiving the movable tab and a pair of openings disposed on a second side. The pair of dovetail connectors of the first fuse holder fit into the pair of openings of the second fuse holder.

BRIEF DESCRIPTION OF THE DRAWINGS

FIGS. 6A-6D are diagrams illustrating the movable tab of the fuse holders of FIG. 1A, in accordance with exemplary embodiments;

FIGS. 7A-7D are diagrams illustrating the movable tab of the fuse holder of FIGS. 1B-1C, in accordance with exemplary embodiments;

DETAILED DESCRIPTION

A fuse holder and fuse holder assembly are disclosed. The fuse holder has a base with a channel and a stud affixed at one end. A movable tab has a second stud affixed thereto. The movable tab slidably fits into the channel and the channel includes elements for securing the movable tab in place. Because of the movable tab, the fuse holder can support bolt-down fuses having various distances between terminal apertures, as the second stud can be moved to accommodate the fuse length. The base has features on either side that allow one or more mounting tabs to be attached to the fuse holder. The features also allow the fuse holder to be attached to other fuse holders. The resulting fuse holder assemblies can support different bolt-down fuses having different sizes and voltage ratings. The fuse holder assemblies can include busbars to reduce the attached cabling.

For the sake of convenience and clarity, terms such as “top”, “bottom”, “upper”, “lower”, “vertical”, “horizontal”, “lateral”, “transverse”, “radial”, “inner”, “outer”, “left”, and “right” may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1A:
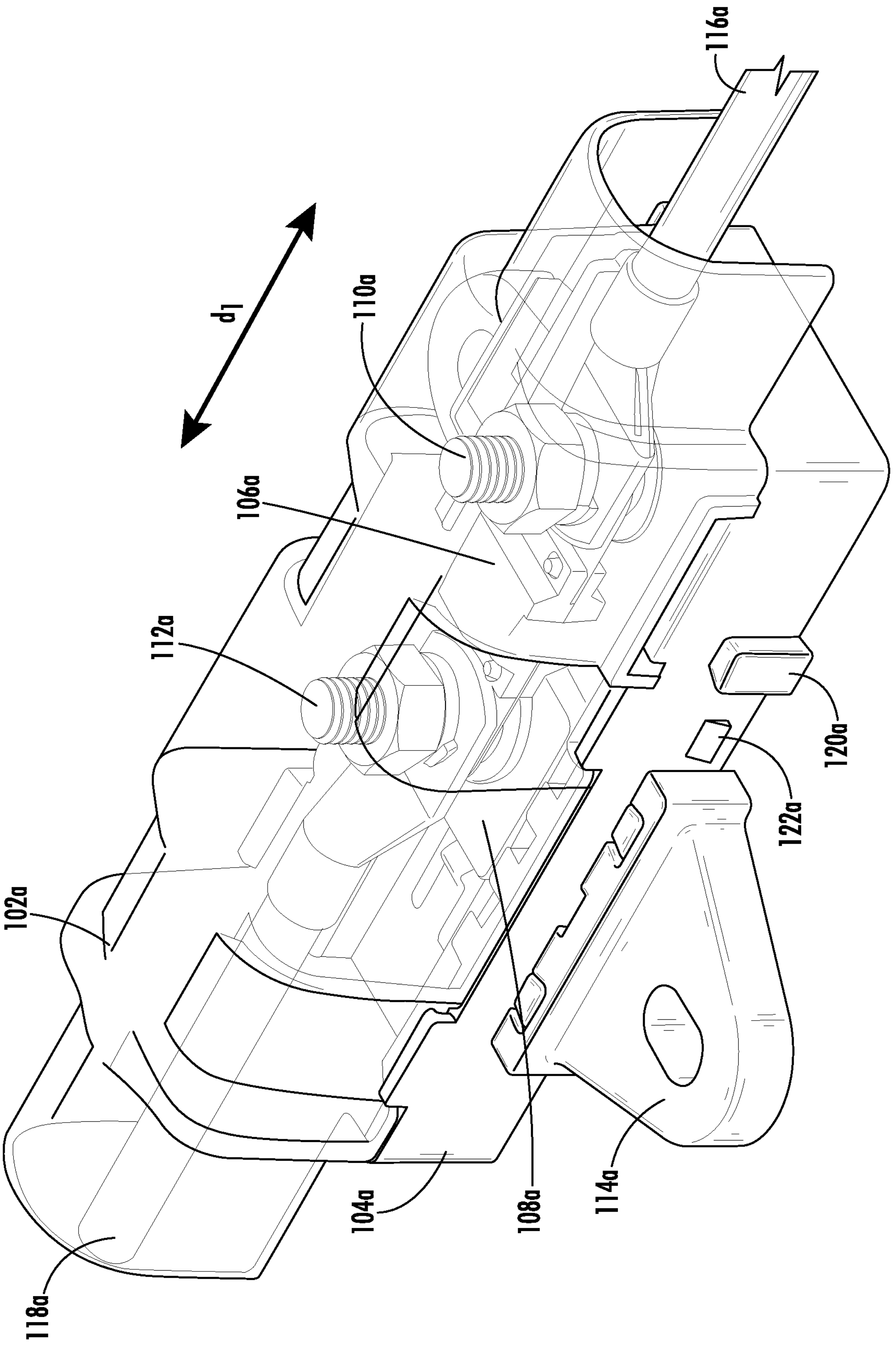
FIGS. 1A-1C are diagrams illustrating a fuse holder, in accordance with exemplary embodiments.
Figure 1B:
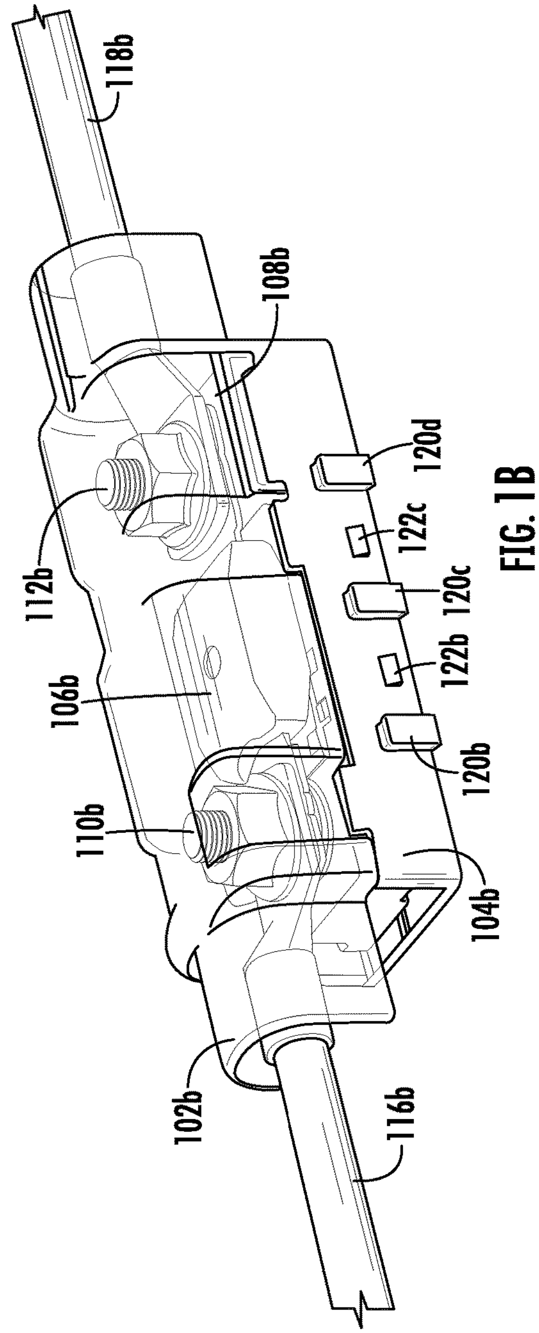
Figure 1C:
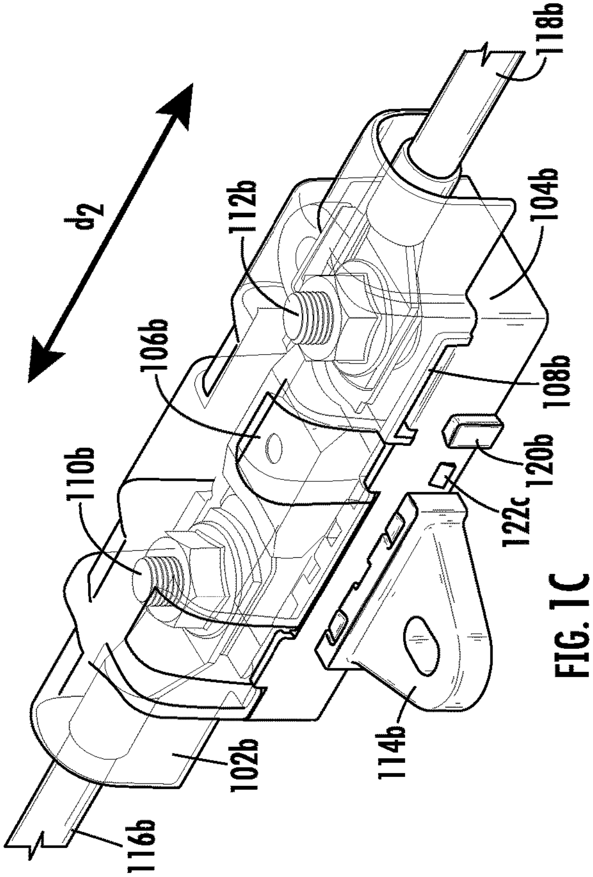

FIGS. 1A-1C are representative drawings of fuse holders 100 for securing bolt-down fuses, according to exemplary embodiments. FIG. 1A is a perspective view of a first fuse holder 100A and FIGS. 1B-1C are perspective views of a second fuse holder 100B (collectively, "fuse holder(s) 100"). Fuse holder 100A includes a cover 102*a*, a base 104*a*, a movable tab 108*a*, and, optionally, a mounting tab 114*a*; fuse holder 100B includes a cover 102*b*, a base 104*b*, a movable tab 108*b*, and, optionally, a mounting tab 114*b* (collectively, "cover(s) 102", "base(s) 104", "moveable tab(s) 108", and "mounting tab(s) 114"). The fuse holder 100A provides protection for a fuse 106*a* that is secured by both a fixed stud 110*a* connected to a cable 116*a* and a movable stud 112*a* connected to a cable 118*a*, where the movable stud is mounted to the movable tab 108*a*; similarly, the fuse holder 100B provides protection for a fuse 106*b* that is secured by both a fixed stud 110*b* connected to a cable 116*b* and a movable stud 112*b* connected to a cable 118*b*, where the movable stud is mounted to the movable tab 108*b* (collectively, "fuse(s) 106", "fixed stud(s) 110", "movable stud(s) 112", "cable(s) 116" and "cable(s) 118"). Alternatively, one or both studs 110 and 112 may be connected to a busbar rather than a cable, such as when multiple fuse holders 100 are stacked together. Examples of such stacked configurations are shown in FIGS. 12B-12E, below.

In exemplary embodiments, the fixed stud 110*a* and the movable stud 112*a* of the fuse holder 100A are M6 studs while the fixed stud 110*b* and the movable stud 112*b* of the fuse holder 100B are M8 studs. In other embodiments, the fuse holders 100A and 100B are adapted to support M4 studs, M5 studs, and studs of other dimensions, as the size of the stud is not meant to be limiting. In exemplary embodiments, the fuse holder 100 may be adapted to accommodate different stud sizes.

Figure 2C:
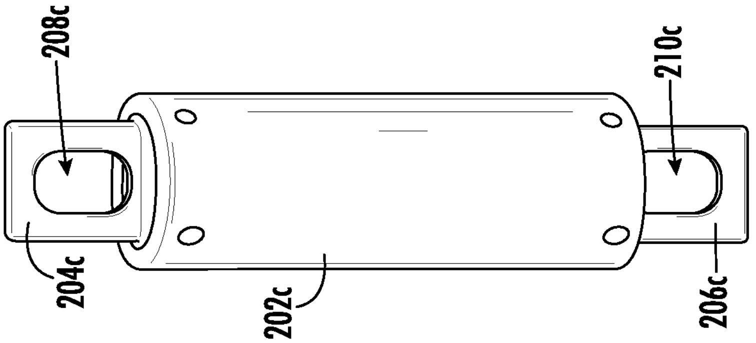
FIGS. 2A-2C are diagrams illustrating examples of fuses suitable for use in the fuse holder of FIGS. 1A-1C, in accordance with exemplary embodiments.
Figure 2A:
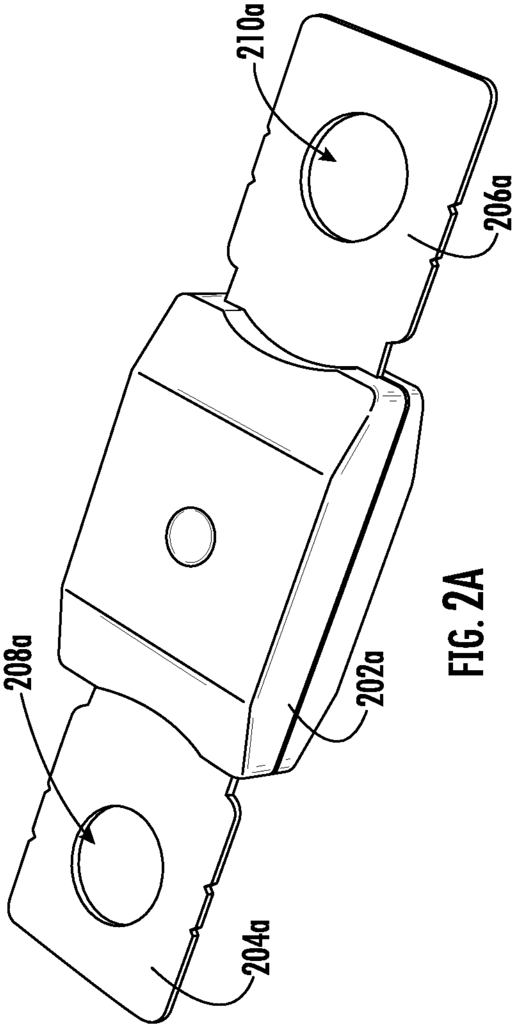
Figure 2B:
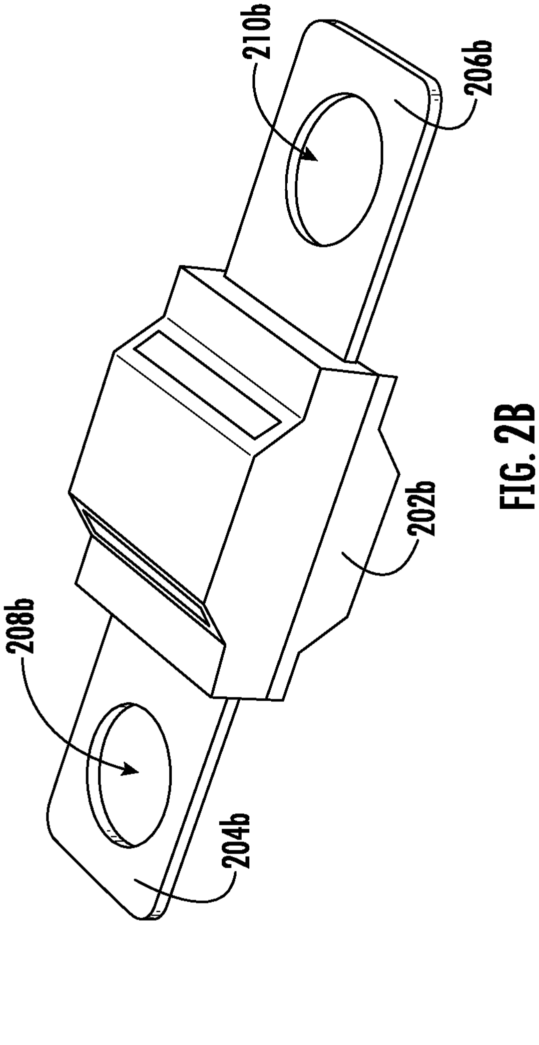

As will be shown herein, the fuse holders 100A and 100B are designed to be used with a variety of different types of linear, bolt-down fuses. FIGS. 2A-2C are representative drawings of three bolt-down fuses 106*a-c*, which are suitable for use in the fuse holders 100A or 100B. FIG. 2A shows a MEGA bolt-down fuse 106*a*; FIG. 2B shows a MIDI bolt-down fuse 106*b*; and FIG. 2C shows an EV1 bolt-down fuse 106*c*. Fuse 106*a* features a fuse housing 202*a*, a terminal 204*a* having a stud aperture 208*a*, and a terminal 206*a* having a stud aperture 210*a*. Fuse 106*b* features a fuse housing 202*b*, a terminal 204*b* having a stud aperture 208*b*, and a terminal 206*b* having a stud aperture 210*b*. Fuse 106*c* features a fuse housing 202*c*, a terminal 204*c* having a stud aperture 208*c*, and a terminal 206*c* having a stud aperture 210*c* (collectively, "fuse housing 202", "terminal(s) 204", "terminal(s) 206", "stud aperture(s) 208", and "stud aperture(s) 210"). For purposes of describing the fuse holder 100, a bolt-down fuse is thus defined herein as a fuse having a first terminal 204 with a stud aperture 208 and a second terminal 206 also with a stud aperture 210, where the fuse housing 202 is linearly aligned between the first terminal and the second terminal. The fuses 106*a-c* of FIGS. 2A-2C are known as bolt-down fuses because studs are inserted through the stud apertures to bolt the fuses to either a cable (typically having a ring terminal on its end), to a busbar, or to both a cable and busbar.

The fuses 106 suitable for the fuse holder 100 may vary in size and voltage rating. In exemplary embodiments, the fuse holder 100 secures different sizes and types of bolt-down fuses. Returning to FIGS. 1A and 1C, the fixed stud 110*a* is a distance, $d_1$, from the movable stud 112*a* in the fuse holder 100A while the fixed stud 110*b* is a distance, $d_2$, from the movable stud 112*b* in the fuse holder 100B, where $d_1 \neq d_2$. This means that the distance between stud apertures of the two terminals of the fuse 106*a* is different from that of the fuse 106*b*. In exemplary embodiments, the fuse holder 100 is designed to accommodate different stud aperture distances. The fuse holder 100 is also designed to accommodate different fuse centerlines.

In exemplary embodiments, the base 104 of the fuse holder 100 includes features both for affixing the optional mounting tab 114 and for stacking multiple fuse holders next to one another. Dovetail connector 120*a* and lock ramps 122*a* are shown on the base 104*a* of fuse holder 100A (FIG. 1A) while dovetail connectors 120*b*, 120*c*, and 120*d* and lock ramps 122*b* and 122*c* are shown on the base 104*b* of fuse holder 100B (FIG. 1C) (collectively, "dovetail connector(s) 120" and "lock ramp(s) 122"). The dovetail connectors 120 and lock ramps 122 are described in more detail in the description of FIGS. 4A-4D, 5A-5D, 9A-9D, and 10A-10D, below.

Figure 3:
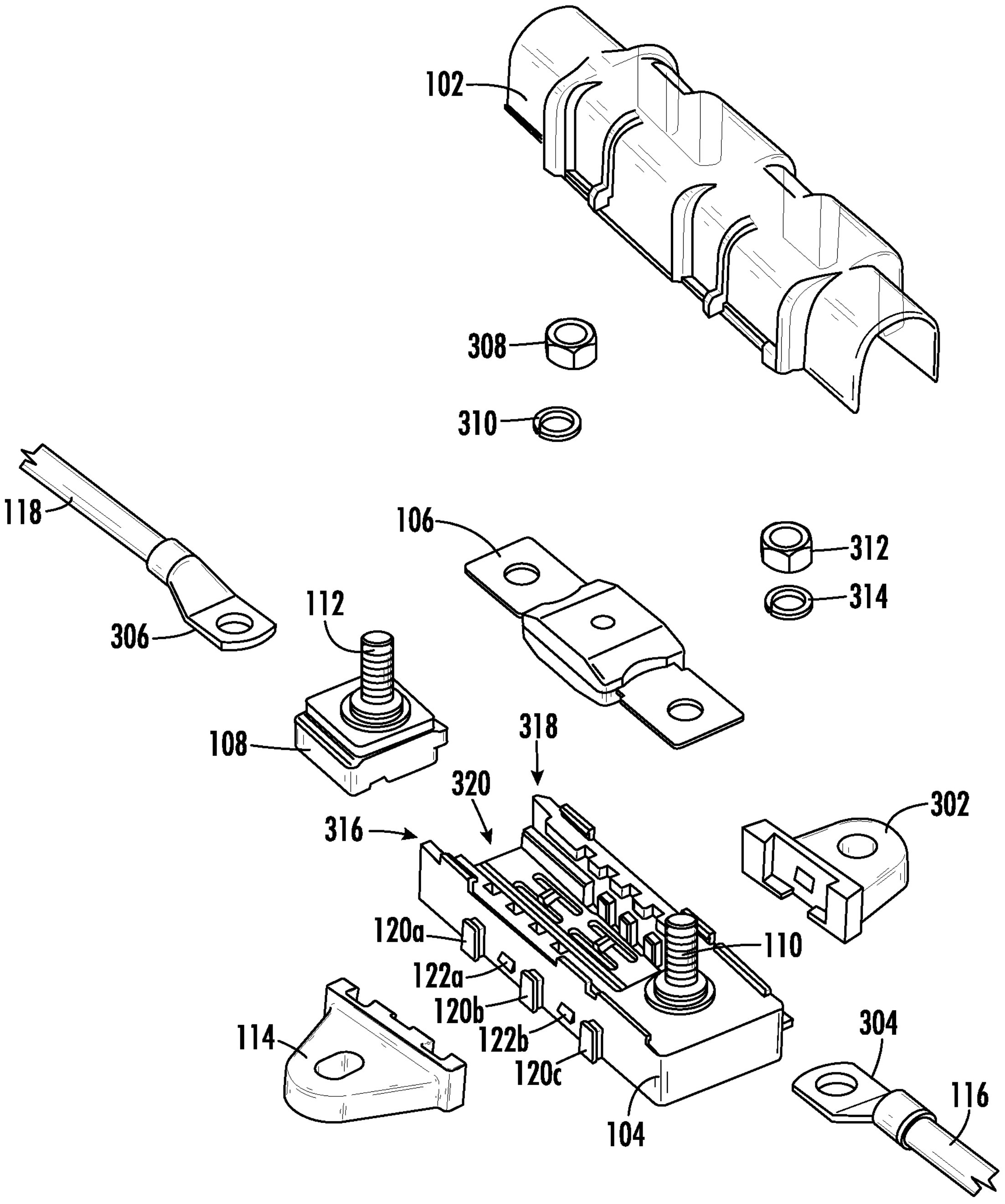
FIG. 3 is a diagram illustrating the fuse holder of FIGS. 1A-1C, in accordance with exemplary embodiments.

FIG. 3 is a representative exploded view of the fuse holder 100, according to exemplary embodiments. The cover 102, the base 104, the movable tab 108, the fixed stud 110, the movable stud 112, and the optional mounting tab 114 of the fuse holder 100 are shown as before. Additionally, the fuse 106 to be disposed inside the fuse holder 100, the cable 116, and the cable 118 are shown. Dovetail connectors 120*a*-120*c* and lock ramps 122*a-b* are shown, with lock ramp 122*a* being between dovetail connector 120*a* and 120*b* and lock ramp 122*b* being between dovetail connector 120*b* and 120*c*.

The movable stud 112 is disposed upon the movable tab 108. Cable 116 includes ring terminal 304 and cable 118 includes ring terminal 306. Once the movable tab 108 is in position inside the base 104, the terminals of the fuse 106 are placed over the fixed stud 110 and the movable stud 112. The ring terminal 304 of cable 116 is then placed over the fixed stud 110 while the ring terminal 306 of the cable 118 is placed over the movable stud 112. An optional washer 310 is placed over the movable stud 112 and a nut 308 is threaded over the stud to secure the assembly on one side of the fuse 106. An optional washer 314 is placed over the fixed stud 110 and a nut 312 threaded over the stud to secure the assembly on the other side of the fuse 106.

The base 104 has a side 316 and a side 318. In exemplary embodiments, the side 316 is different from the side 318. A second optional mounting tab 302 is shown. The dovetail connectors 120 and lock ramps 122 on the side 316 of the base 104 are used to secure the mounting tab 114 while dovetail connectors (not shown) on the side 318 of the base are used to secure the mounting tab 302. In exemplary embodiments, the mounting tab 114 is configured differently than the mounting tab 302, as the side 316 of the base 104 is different from the side 318. Thus, the mounting tab 114 is designed to be attached to the side 316 while the mounting tab 302 is designed to be attached to the side 318 of the base. In exemplary embodiments, the cover 102, the base 104, the mounting tab 114, and the mounting tab 302 are made of a non-conductive plastic while the studs 110 and 112 are made of a stainless steel.

The base 104 includes a channel 320 that is sized to receive the movable tab 108. Disposed between the side 316 and the side 318, the channel 320 includes several features that enable the movable tab 108 to be secured within the base. These features are described in more detail in FIGS. 4A-4D and FIGS. 5A-5D, below.

Figure 4B:
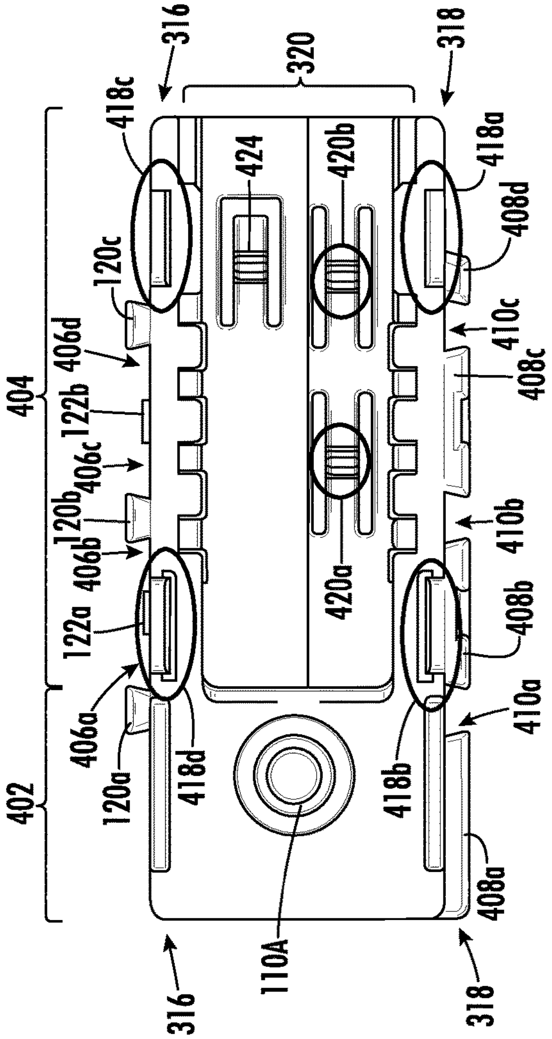
FIGS. 4A-4E are diagrams illustrating the base of the fuse holder of FIG. 1A, in accordance with exemplary embodiments.
Figure 4D:
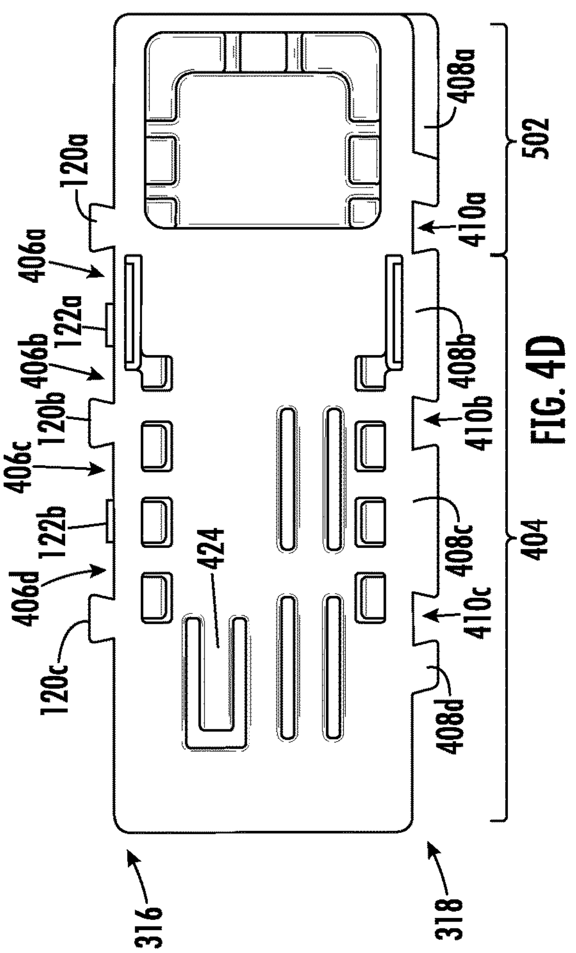
Figure 4A:
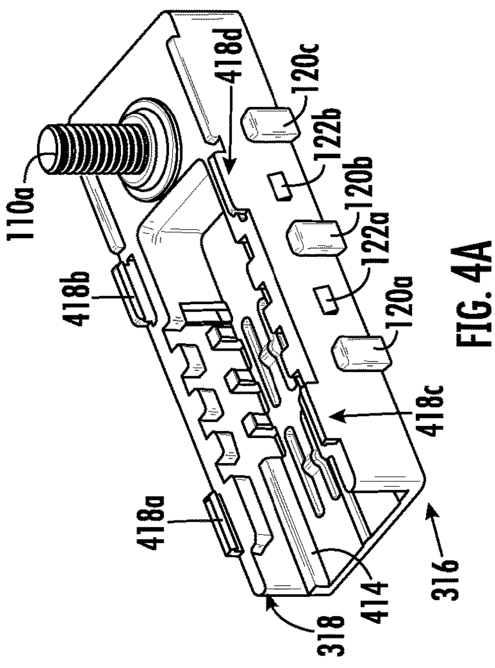
Figure 4C:
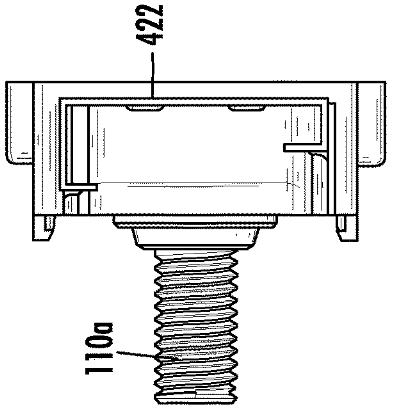
Figure 4E:
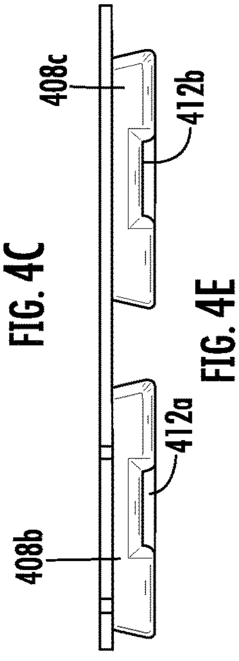

FIGS. 4A-4E are representative drawings of the base 104*a* of the fuse holder 100A, according to exemplary embodiments. FIG. 4A is a perspective view, FIG. 4B is an overhead view, FIG. 4C is a side view, and FIG. 4D is a bottom view of the base 104*a*, while FIG. 4E is a close-up view of one edge of the base 104*a* with the dovetail connectors. The base 104*a* has a fixed stud end 402 and a movable tab region 404 as well as sides 316 and 318. In exemplary embodiments, the stud 110*a* is an M6 stud. The movable tab region 404 includes the channel 320 for receiving the movable tab 108 and includes several features for ensuring that the movable tab is fixed in place once its position is determined. The position of the movable tab 108 within the channel 320 is determined by the length of the fuse 106 and, more specifically, by the distance between stud apertures 208 and 210 of the fuse terminals 204 and 206, respectively.

Dovetail connectors 120*a-c* and lock ramps 122*a-b* are shown on side 316 in FIGS. 4A, 4B, and 4D. As shown in FIG. 3, these dovetail connectors 120 and lock ramps 122 may be used to connect the base 104*a* to the mounting tab 114. Further, the dovetail connectors 120 and lock ramps 122 are used to connect the base 104*a* to a second and/or third base, such that the fuse holder 100A may be stacked with one or two additional fuse holders, such as a fuse holder being on either side of the fuse holder 100A.

Between the dovetail connectors 120 and lock ramps 122 are dovetail openings 406*a-d* (collectively, "dovetail opening(s) 406"), located on side 316 of the base 104*a*. Dovetail opening 406*a* is between dovetail connector 120*a* and lock ramp 122*a*; dovetail opening 406*b* is between lock ramp 122*a* and dovetail connector 120*b*; dovetail opening 406*c* is between dovetail connector 120*b* and lock ramp 122*b*; and dovetail opening 406*d* is between lock ramp 122*b* and dovetail connector 120*c*.

On side 318 of the base 104*a* are differently shaped dovetail connectors as well as dovetail openings. Dovetail connector 408*a* is on the fixed stud end of the base 104*a*; in the movable tab region 404 are dovetail connectors 408*b*, 408*c*, and 408*d* (collectively, "dovetail connector(s) 408"). Dovetail openings 410*a-c* are also shown, with dovetail opening 410*a* being between dovetail connectors 408*a* and 408*b*, dovetail opening 410*b* being between dovetail connectors 408*b* and 408*c*, and dovetail opening 410*c* being between dovetail connector 408*c* and 408*d* (collectively, "dovetail opening(s) 410"). In exemplary embodiments, the dovetail openings 410 have a predefined shape that is similar to that of the dovetail connectors 120 on the other side of the base 104*a*. Further, in exemplary embodiments, the distance between dovetail openings 410*a* and 410*b* is the same as the distance between dovetail connector 120*a* and 120*b*; similarly, the distance between dovetail opening 410*b* and 410*c* is the same as the distance between dovetail connector 120*b* and 120*c*.

The dovetail connectors 120 are thus able to "fit" into the dovetail openings 410. This symmetry enables the base of second and/or third fuse holders to be connected to the base of the fuse holder 100. Thus, dovetail opening 410*a* is shaped to receive dovetail connector 120*a* of a second fuse holder base, dovetail opening 410*b* is shaped to receive dovetail connector 120*b* of the second fuse holder base, and dovetail opening 410*c* is shaped to receive dovetail connector 120*c* of the second fuse holder base. Alternatively, the dovetail connector 120*a* is shaped to receive dovetail opening 410*a* of a third fuse holder, the dovetail connector 120*b* is shaped to receive dovetail opening 410*b* of the third fuse holder, and the dovetail connector 120*c* is shaped to receive dovetail opening 410*c* of the third fuse holder.

Although differently shaped from the dovetail connectors 120, dovetail connector 408*b* is similarly shaped to dovetail connector 408*c*. Further, dovetail connector 408*b* is shaped like the combination of opening 406*a*, lock ramp 122*a*, and opening 406*b* while dovetail connector 408*c* is shaped like the combination of opening 406*c*, lock ramp 122*b*, and opening 406*d*. Further, as shown in FIG. 4E, dovetail connectors 408*b* and 408*c* include lock ramp receivers 412*a* and 412*b*, respectively (collectively, "lock ramp receiver(s) 412"). When connecting a different base to the base 104*a*, the lock ramp 122*a* fits into lock ramp receiver 412*a* of dovetail connector 408*b* while lock ramp 122*b* fits into lock ramp receiver 412*b* of dovetail connector 408*c*.

The configuration of the sides 316 and 318 of the base 104*a* may also be used to connect the optional mounting tabs 114 and 302, respectively. The mounting tabs are more fully described in FIGS. 9A-9D and 10A-10D, below. In exemplary embodiments, each mounting tab can assume one of two positions along its respective side of the base 104*a*. Thus, mounting tab 114 can be placed in one of two positions on side 316 of base 104*a* while mounting tab 302 can be placed in one of two positions on side 318 of base 104*a*. This flexibility allows the mounting tabs 114 and 302 to be offset relative to one another, which may be beneficial in limited-space environments. The stacked fuse holder configurations of FIGS. 12B-12E, below, show the mounting tabs 114 offset relative to the mounting tabs 302.

The channel 320 within the movable tab region 404 includes several elements that facilitate coupling of the movable tab 108*a* (with the movable stud 112*a* thereon) with the base 104*a*. A keying guide 414 provides a position indication for insertion of the movable tab 108*a*. The keying guide 414 is shown on the side 318 of the base 104*a*, and there is a second keying guide (not shown) on the side 316 of the base as well. There are opposing "gaps" between the top and bottom of the slide area to allow the keying guide 414 to be tooled for molding.

Cover lock receivers 418*a-d* are shown in FIG. 4B (collectively, "cover lock receiver(s) 418") are used to affix the cover 102 to the base 104*a*. Bumps 420*a-b* are shown for securing the movable tab 108*a* to the base 104*a* (collectively, "bump(s) 420"). The bumps 420 enable the movable tab 108*a* to be in one of four different positions within the channel 320 of the base 104*a*, as explained in conjunction with the description of FIGS. 6C and 6D, below. A lock arm 424 bends downward and upward relative to the plane of the base 104*a* to facilitate controlling the position the movable tab 108*a* within the channel 320. The lock arm 424 thus flexes and locks in the movable tab 108*a* when inserted into the movable tab region 404 of the base 104*a*.

An outline (in white) 422 in FIG. 4C indicate a "poka-yoke" region of the base 104*a*. Poka-yoke is a "mistake-avoidance" design concept. The poka-yoke outline 422 shows the shape of movable tab that will fit into the channel 320 of the base 104*a*. The poka-yoke outline 422 indicates that, by design, the base 104*a* will accept movable tab 108*a* (FIG. 6C) but not movable tab 108*b* (FIG. 7C), due to the shape limitation caused by the poka-yoke outline 422. The poka-yoke outline 422 of the base 104*a* ensures that the movable tab 108*a* (which has an M6 stud) is inserted into the movable tab region 404 (rather than the movable tab 108*b*, which has an M8 stud). The poka-yoke outline 422 thus ensures correct pairing of the M6 stud (since the base 104*a* already has an M6 stud in its fixed stud end 402).

Figure 5B:
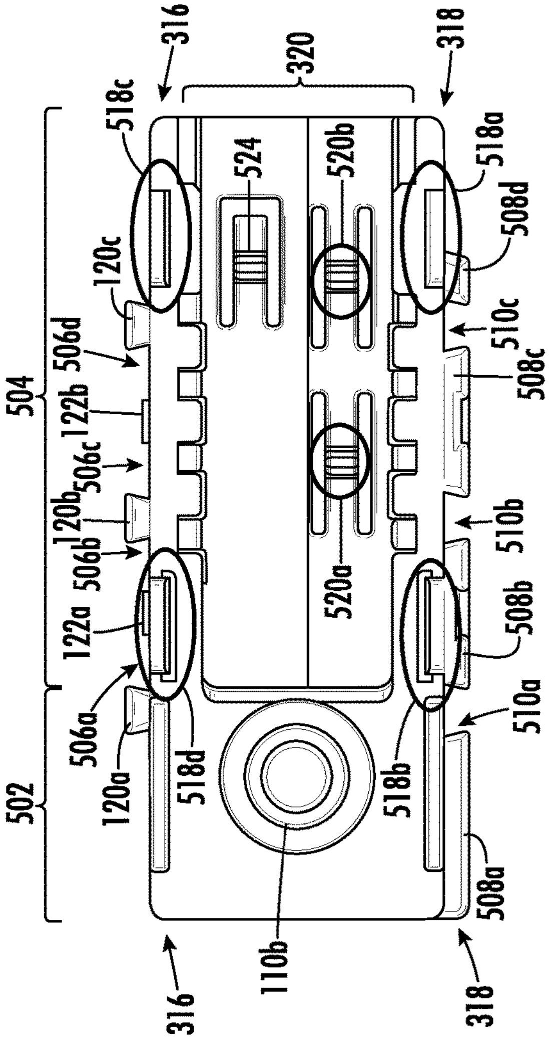
FIGS. 5A-5E are diagrams illustrating the base of the fuse holder of FIGS. 1B-1C, in accordance with exemplary embodiments.
Figure 5D:
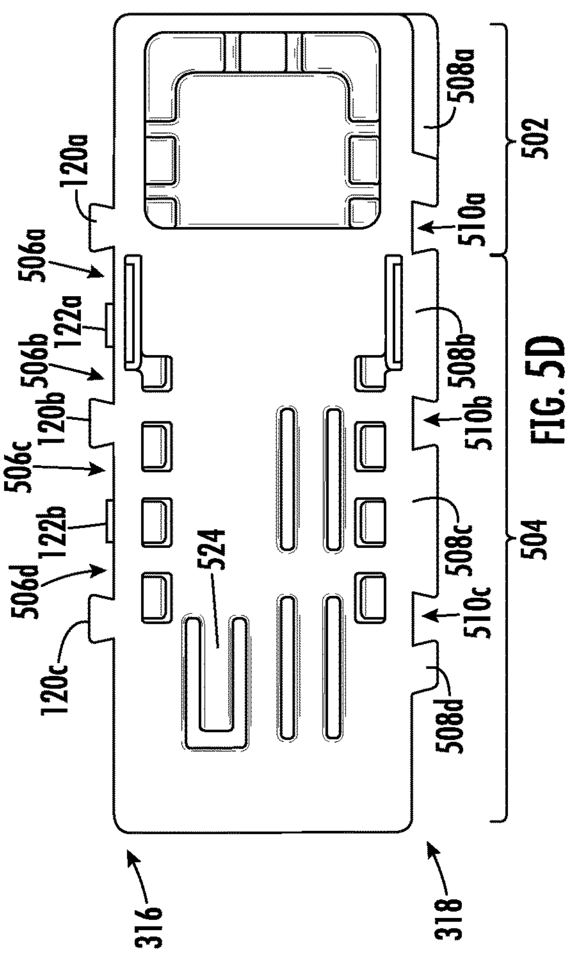
Figure 5A:
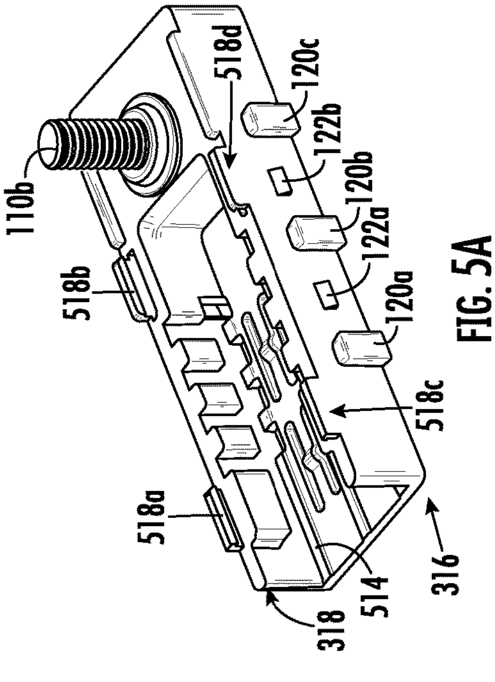
Figure 5C:
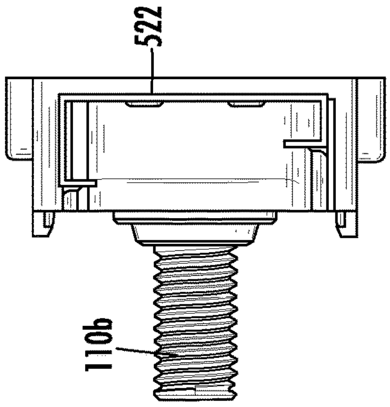
Figure 5E:
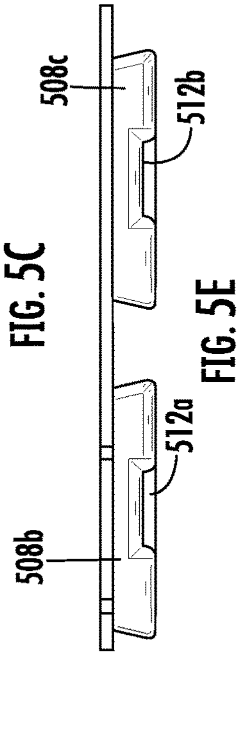

FIGS. 5A-5E are representative drawings of the base 104*b* of the fuse holder 100B, according to exemplary embodiments. FIG. 5A is a perspective view, FIG. 5B is an overhead view, FIG. 5C is a side view, and FIG. 5D is a bottom view of the base 104*b*, while FIG. 5E is a close-up view of one edge of the base 104*b* with the dovetail connectors. The base 104*b* has a fixed stud end 502 and a movable tab region 504 as well as sides 316 and 318. In exemplary embodiments, the stud 110*b* is an M8 stud. The movable tab region 504 includes the channel 320 for receiving the movable tab 108 and includes several features for ensuring that the movable tab is fixed in place once its position is determined. The position of the movable tab 108 within the channel 320 is determined by the length of the fuse 106 and, more specifically, by the distance between stud apertures 208 and 210 of the fuse terminals 204 and 206, respectively.

Dovetail connectors 120*a-c* and lock ramps 122*a-b* are shown on side 316 in FIGS. 5A, 5B, and 5D. As shown in FIG. 3, these dovetail connectors 120 and lock ramps 122 may be used to connect the base 104*b* to the mounting tab 114. Further, the dovetail connectors 120 and lock ramps 122 are used to connect the base 104*b* to a second and/or third base, such that the fuse holder 100B may be stacked with one or two additional fuse holders, such as a fuse holder on either side of the fuse holder 100B.

Between the dovetail connectors 120 and lock ramps 122 are dovetail openings 506*a-d* (collectively, "dovetail opening(s) 506"), located on side 316 of the base 104*b*. Dovetail opening 506*a* is between dovetail connector 120*a* and lock ramp 122*a*; dovetail opening 506*b* is between lock ramp 122*a* and dovetail connector 120*b*; dovetail opening 506*c* is between dovetail connector 120*b* and lock ramp 122*b*; and dovetail opening 506*d* is between lock ramp 122*b* and dovetail connector 120*c*.

On side 318 of the base 104*b* are differently shaped dovetail connectors as well as dovetail openings. Dovetail connector 508*a* is on the fixed stud end of the base 104*b*; in the movable tab region 504 are dovetail connectors 508*b*, 508*c*, and 508*d* (collectively, "dovetail connector(s) 508"). Dovetail openings 510*a-c* are also shown, with dovetail opening 510*a* being between dovetail connectors 508*a* and 508*b*, dovetail opening 510*b* being between dovetail connectors 508*b* and 508*c*, and dovetail opening 510*c* being between dovetail connector 508*c* and 508*d* (collectively, "dovetail opening(s) 510"). In exemplary embodiments, the dovetail openings 510 are shaped like the dovetail connectors 120 on the other side of the base 104*b*. Further, in exemplary embodiments, the distance between dovetail openings 510*a* and 510*b* is the same as the distance between dovetail connector 120*a* and 120*b*; similarly, the distance between dovetail opening 510*b* and 510*c* is the same as the distance between dovetail connector 120*b* and 120*c*.

The dovetail connectors 120 are thus able to "fit" into the dovetail openings 510. This symmetry enables the base of second and/or third fuse holders to be connected to the base of the fuse holder 100. Thus, dovetail opening 510*a* is shaped to receive dovetail connector 120*a* of a second fuse holder base, dovetail opening 510*b* is shaped to receive dovetail connector 120*b* of the second fuse holder base, and dovetail opening 510*c* is shaped to receive dovetail connector 120*c* of the second fuse holder base. Alternatively, the dovetail connector 120*a* is shaped to receive dovetail opening 510*a* of a third fuse holder, the dovetail connector 120*b* is shaped to receive dovetail opening 510*b* of the third fuse holder, and the dovetail connector 120*c* is shaped to receive dovetail opening 510*c* of the third fuse holder.

Although differently shaped from the dovetail connectors 120, dovetail connector 508*b* is similarly shaped to dovetail connector 508*c*. Further, dovetail connector 508*b* is shaped like the combination of opening 506*a*, lock ramp 122*a*, and opening 506*b* while dovetail connector 508*c* is shaped like the combination of opening 506*c*, lock ramp 122*b*, and opening 506*d*. Further, as shown in FIG. 5E, dovetail connectors 508*b* and 508*c* include lock ramp receivers 512*a* and 512*b*, respectively (collectively, "lock ramp receiver(s) 512"). When connecting a different base to the base 104*b*, the lock ramp 122*a* fits into lock ramp receiver 512*a* of dovetail connector 508*b* while lock ramp 122*b* fits into lock ramp receiver 512*b* of dovetail connector 508*c*.

Further, in exemplary embodiments, dovetail connectors 408 (FIGS. 4A and 4D) are identical to dovetail connectors 508 (FIGS. 5A and 5D), dovetail openings 406 are identical to dovetail connectors 506, and dovetail openings 410 are identical to dovetail openings 510. This means that fuse holder 100A (which has M6 studs 110*a* and 112*a*) can be stacked with fuse holder 100B (which has M8 studs 110*b* and 112*b*).

The configuration of sides 316 and 318 of the base 104*b* may also be used to connect the optional mounting tabs 114 and 302, respectively. The mounting tabs are more fully described in FIGS. 9A-9D and 10A-10D, below. In exemplary embodiments, each mounting tab can assume one of two positions along its respective side of the base 104*b*. Thus, mounting tab 114 can be placed in one of two positions on side 316 of base 104*b* while mounting tab 302 can be placed in one of two positions on side 318 of base 104*b*. This flexibility allows the mounting tabs 114 and 302 to be offset relative to one another, which may be beneficial in limited-space environments. The stacked fuse holder configurations of FIGS. 12B-12E, below, show the mounting tabs 114 offset relative to the mounting tabs 302.

The channel 320 within the movable tab region 504 includes several elements that facilitate coupling of the movable tab 108*b* (with the movable stud 112*b* thereon) with the base 104*b*. A keying guide 514 provides a position indication for insertion of the movable tab 108*b*. The keying guide 514 is shown on the side 318 of the base 104*b*, and there is a second keying guide (not shown) on the side 316 of the base as well. There are opposing "gaps" between the top and bottom of the slide area to allow the slide to be tooled for molding.

Cover lock receivers 518*a-d* are shown in FIGS. 5B and 5D (collectively, "cover lock receiver(s) 518") are used to affix the cover 102 to the base 104*b*. Bumps 520*a-b* are shown for securing the movable tab 108*b* to the base 104*b* (collectively, "bump(s) 520"). The bumps 520 enable the movable tab 108*b* to be in one of four different positions within the channel 320 of the base 104*b*, as explained in conjunction with the description of FIGS. 7C and 7D, below. A lock arm 524 bends downward and upward relative to the plane of the base 104*b* to facilitate controlling the position the movable tab 108*b* within the channel 320. The lock arm 524 thus flexes and locks in the movable tab 108*b* when inserted into the movable tab region 504 of the base 104*b*.

Outline (in white) 522 in FIG. 5C indicates a "poka-yoke" region of the base 104*b*. The poka-yoke outline 522 shows the shape of movable tab that will fit into the channel 320 of the base 104*b*. The poka-yoke outline 522 indicates that, by design, the base 104*b* will accept movable tab 108*b* (FIG. 7C) but not movable tab 108*a* (FIG. 6C), due to the shape limitation caused by the poka-yoke outline 522. The poka-yoke outline 522 of the base 104*b* ensures that the movable tab 108*b* (which has an M8 stud) is inserted into the movable tab region 504 (rather than the movable tab 108*a*, which has an M6 stud). The poka-yoke outline 522 thus ensures correct pairing of M8 studs (since the base 104*b* already has an M8 stud in its fixed stud end 502).

FIGS. 6A-6D are representative drawings of the movable tab 108*a* for the fuse holder 100A, according to exemplary embodiments. FIG. 6A is a perspective view, FIG. 6B is an overhead view, FIG. 6C is a side view, and FIG. 6D is a bottom view of the movable tab 108*a*. In exemplary embodiments, the movable stud 112*a* is an M6 stud. On one side, the movable tab 108*a* includes an upper level 602, a middle level 604, and a lower level 606, while, on the other side, the movable tab 108*a* includes the upper level 602 and a bottom level 608, with the movable stud 112*a* emerging from the upper level 602.

In the side view of FIG. 6C, the middle level 604 is shown as protruding outward, relative to the upper level 602 and the lower level 606. The poka-yoke outline 422 (introduced in FIG. 4C) is the shape of the base 104*a* and is superimposed over the movable tab 108*a* (and is also shown isolated to the left of FIG. 6C). The movable tab 108*a* having the arrangement of levels 602, 604, and 606 on one side and levels 602 and 608 on the other side as shown conforms to the shape of the poka-yoke outline 422. Thus, the movable tab 108*a* can be inserted into the base 104*a*, while the movable tab 108*b*, which has a different arrangement of levels (FIG. 7C), would not be insertable into the base 104*a*.

An indentation 610*a* is shown on one side of the movable tab 108*a* (FIG. 6C) and indentations 610*a-d* (collectively, "indentation(s) 610") are shown on the bottom of the movable tab 108*a* (FIG. 6D). The indentations 610 are used to help secure the movable tab 108*a* inside the base 104*a* of fuse holder 100A. As the movable tab 108*a* is slid into the base 104*a* of the fuse holder 100A, bump 420*a* of the base (FIG. 4B) may fit into indentation 610*c* or 610*d*, or bump 420*b* may fit into indentation 610*c* or 610*d*. This means that the movable tab 108*a* may be in up to four different positions within the channel 320 of the base 104*a*. Meanwhile, lock arm 424 flexes during movement of movable tab 108*a* and is positioned over indentation 610*b* or indentation 610*a*. Once seated in the desired channel 320 location, the lock arm 424 flexes back, preventing the movable tab 108*a* from falling out of the channel 320. Further, the indentation 610*a* is a material saver that helps to reduce the engagement force with the lock arm 424. Thus, the indentations 610 of the movable tab 108*a*, along with the bumps 420 and lock arm 424 of the base 102*a*, ensure that the movable tab is secured inside the base.

In FIG. 6B, the movable stud 112*a* is shown off-centered. Further, although the movable stud 112*a* is one diameter, the base portion of the movable stud is a larger diameter. In exemplary embodiments, the off-center position of the movable stud 112*a* as well as the inclusion of a larger-diameter base portion allows a single busbar to be used with the movable tab 108*a* as well as the movable tab 108*b* (FIGS. 7A-7D).

FIGS. 7A-7D are representative drawings of the movable tab 108*b* for the fuse holder 100B, according to exemplary embodiments. FIG. 7A is a perspective view, FIG. 7B is an overhead view, FIG. 7C is a side view, and FIG. 7D is a bottom view of the movable tab 108*b*. In exemplary embodiments, the movable stud 112*b* is an M8 stud. On one side, the movable tab 108*b* includes an upper level 702 and a lower level 704, while, on the other side, the upper level 702 has a long side 706 and there is a second lower level 708, with the movable stud 112*b* emerging from the upper level 702.

In the side view of FIG. 7C, the differences between the two sides of the movable tab 108*b* are evident. The upper level 702 is shorter on one side, while the lower level 704 is taller than the lower level 708. The poka-yoke outline 522 (introduced in FIG. 5C) is the shape of the base 104*b* and is superimposed over the movable tab 108*b* (and is also shown isolated to the left of FIG. 7C). The movable tab 108*b* having the arrangement of levels 702 and 704 on one side and levels 706 and 708 on the other side as shown conforms to the shape of the poka-yoke outline 522. Thus, the movable tab 108*b* can be inserted into the base 104*b*, while the movable tab 108*a*, which has a different arrangement of levels (FIG. 6C), would not be insertable into the base 104*b*.

An indentation 710*a* is shown on one side of the movable tab 108*b* (FIG. 7C) and indentations 710*a-d* (collectively, "indentation(s) 710") are also shown on the bottom of the movable tab 108*b* (FIG. 7D). The indentations 710 are used to help secure the movable tab 108*b* inside the base 104*b* of fuse holder 100B. As the movable tab 108*b* is slid into the base 104*b* of the fuse holder 100B, bump 520*a* of the base (FIG. 5B) may fit into indentation 710*c* or 710*d*, or bump 520*b* may fit into indentation 710*c* or 710*d*. This means that the movable tab 108*b* may be in up to four different positions within the channel 320 of the base 104*b*. Meanwhile, lock arm 524 flexes during movement of movable tab 108*b* and is positioned over indentation 710*b* or indentation 710*a*. Once seated in the desired channel 320 location, the lock arm 524 flexes back, preventing the movable tab 108*b* from falling out of the channel 320. Further, the indentation 710*a* is a material saver that helps to reduce the engagement force with the lock arm 424. Thus, the indentations 710 of the movable tab 108*b*, along with the bumps 520 and lock arm 524 of the base 102*b*, ensure that the movable tab is secured inside the base.

In FIG. 7B, the movable stud 112*b* is shown off-centered. Further, although the movable stud 112*b* is one diameter, the base portion of the movable stud is a larger diameter. In exemplary embodiments, the off-center position of the movable stud 112*b* as well as the inclusion of a larger-diameter base portion allows a single busbar to be used with the movable tab 108*b* as well as the movable tab 108*a* (FIGS. 6A-6D).

Figure 8A:
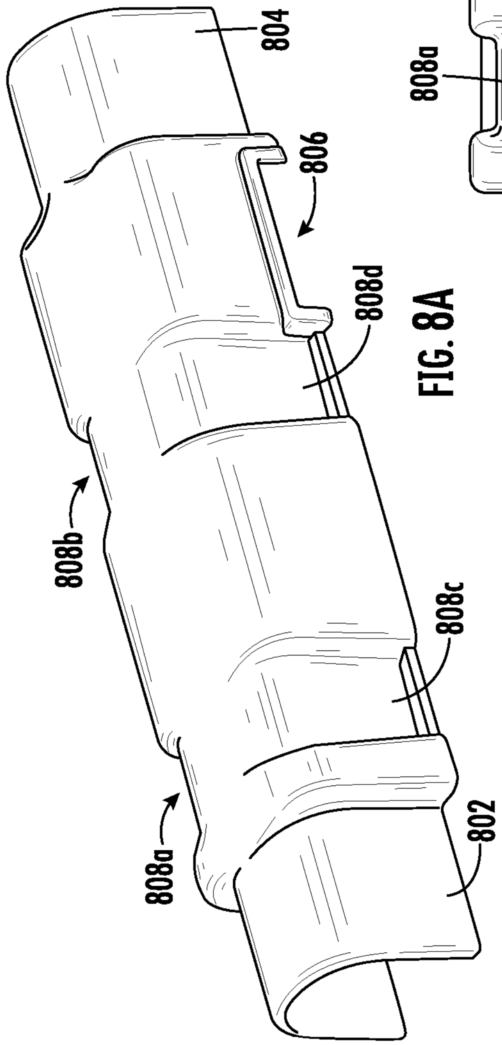
FIGS. 8A-8D are diagrams illustrating the cover of the fuse holders of FIGS. 1A-1C, in accordance with exemplary embodiments.
Figure 8B:
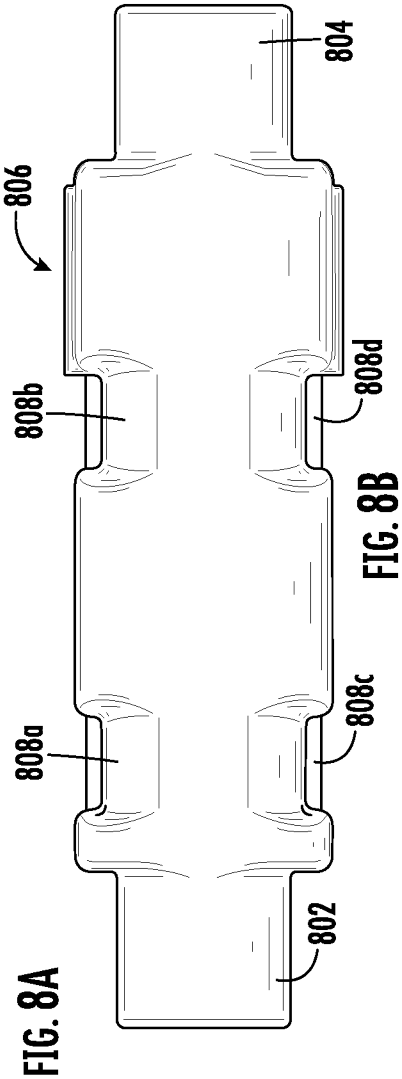
Figure 8C:
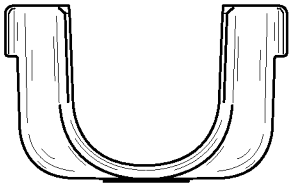
Figure 8D:
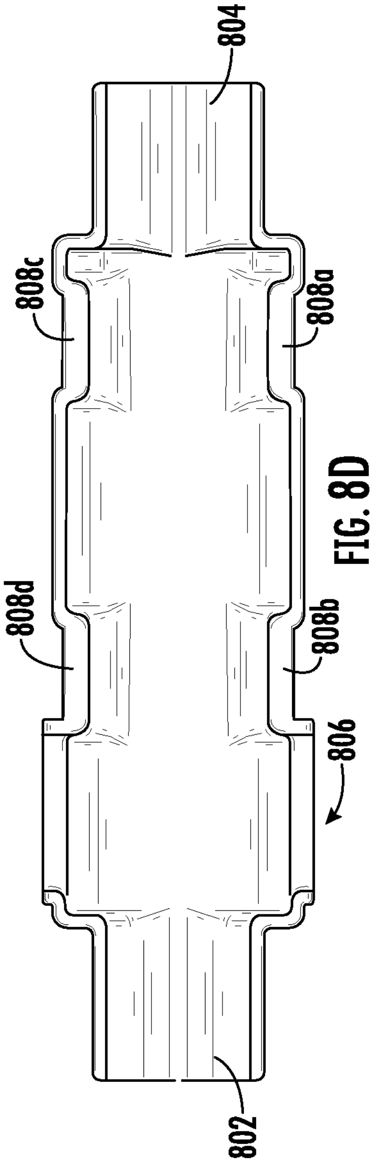

FIGS. 8A-8D are representative drawings of the cover 102 of the fuse holder 100A or the fuse holder 100B, according to exemplary embodiments. FIG. 8A is a perspective view, FIG. 8B is an overhead view, FIG. 8C is a side view, and FIG. 8D is a bottom view of the cover 102. The cover 102 is shaped to accommodate a variety of cable sizes. The cover 102 includes a first end 802 at one end of the cover, from which a cable may optionally be disposed, and a second end 804 at the other end of the cover, from which a second cable may optionally be disposed. The cover 102 also includes a busbar opening 806 through which a busbar may be disposed. Four base lock receivers 808*a-d* (collectively, "base lock receiver(s) 808") are shown. The base lock receivers 808 are shaped for engaging with cover lock receivers 418 of the base 104*a* (FIG. 4B) or with cover lock receivers 518 of the base 104*b* (FIG. 5B), thus securing the cover 102 to the base.

Figures 9A, 9B, 9C, 9D, 10A, 10B, 10C, 10D:
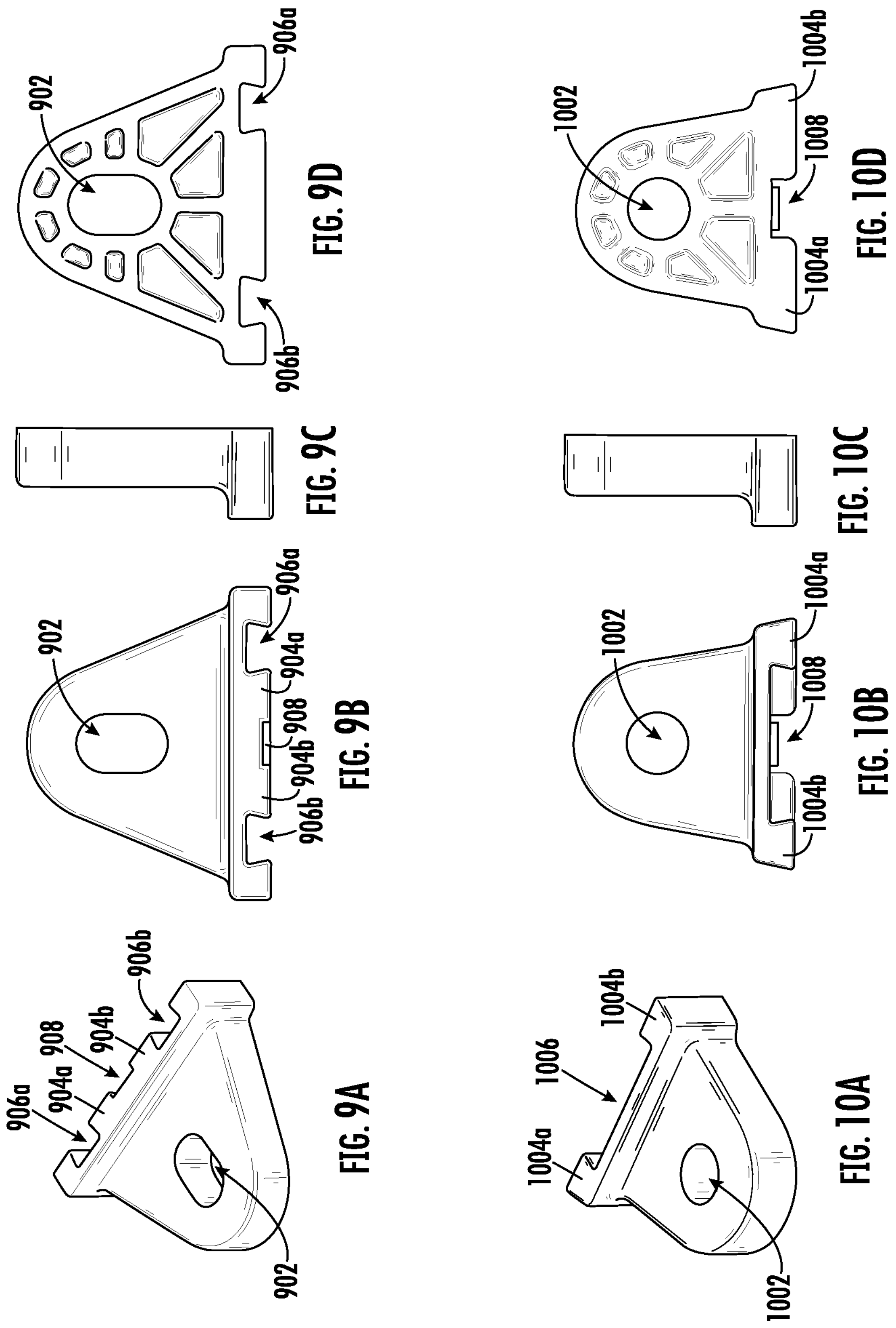
FIGS. 9A-9D are diagrams illustrating the first mounting tab of the fuse holder of FIGS. 1A-1C, in accordance with exemplary embodiments.
FIGS. 10A-10D are diagrams illustrating the second mounting tab of the fuse holder of FIGS. 1A-1C, in accordance with exemplary embodiments.

FIGS. 9A-9D are representative drawings of the mounting tab 114 used to secure the fuse holder 100A or 100B, according to exemplary embodiments. FIG. 9A is a perspective view, FIG. 9B is an overhead view, FIG. 9C is a side view, and FIG. 9D is a bottom view of the mounting tab 114. The mounting tab 114 includes an aperture 902 through which a bolt, stud, or nail is driven, for mounting the fuse holder 100 to a surface.

Recall from FIG. 3 that mounting tab 114 is to be connected to side 316 of the base 104. Thus, the mounting tab 114 includes dovetail connectors 904*a-b*, dovetail openings 906*a-b*, and a lock ramp receiver 908 (collectively, "dovetail connector(s) 904" and "dovetail opening(s) 906"). Dovetail opening 906*a* will fit into dovetail connector 120*a* (FIG. 4B), dovetail opening 906*b* will fit into dovetail connector 120*b*, and lock ramp 122*a* will fit into lock ramp receiver 908. Alternatively, dovetail opening 906*a* will fit into dovetail connector 120*b*, dovetail opening 906*b* will fit into dovetail connector 120*c*, and lock ramp 122*b* will fit into lock ramp receiver 908. These couplings are possible for the base 104*a* (FIGS. 4A-4E) or for the base 104*b* (FIGS. 5A-5E). There are thus two different positions for the mounting tab 114 to be connected to the side 316 of the base 104.

FIGS. 10A-10D are representative drawings of the mounting tab 302 used to secure the fuse holder 100A or 100B, according to exemplary embodiments. FIG. 10A is a perspective view, FIG. 10B is an overhead view, FIG. 10C is a side view, and FIG. 10D is a bottom view of the mounting tab 302. The mounting tab 302 includes an aperture 1002 through which a bolt, stud, or nail is driven, for mounting the fuse holder 100 to a surface.

Mounting tab 302 includes dovetail connectors 1004*a-b* and dovetail opening 1006 (collectively, "dovetail connector (s) 1004"). A lock ramp 1008 is disposed between dovetail connector 1004*a* and 1004*b*.

Dovetail connector 1004*a* will fit into dovetail opening 410*a* (FIG. 4C) or dovetail opening 510*a* (FIG. 5C) while dovetail connector 1004*b* fits into dovetail opening 410*b* or dovetail opening 510*b*. In this configuration, lock ramp 1008 fits into lock ramp receiver 512*a*. Alternatively, dovetail connector 1004*a* will fit into dovetail opening 410*b* or dovetail opening 510*b* while dovetail connector 1004*b* fits into dovetail opening 410*c* or dovetail opening 510*c*. In this configuration, lock ramp 1008 fits into lock ramp receiver 512*b*. Thus, whether connected to base 104*a* or base 104*b*, there are two possible positions for securing the mounting tab 302 along the side 318.

Figure 11:
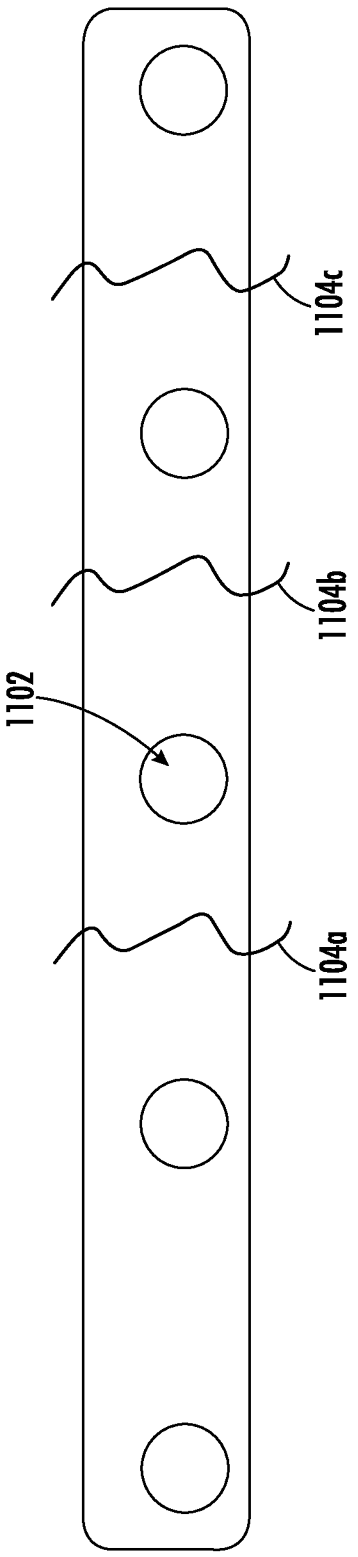
FIG. 11 is a diagram illustrating a busbar of the fuse holder of FIGS. 1A-1C, in accordance with exemplary embodiments.

FIG. 11 is a representative drawing of a busbar 1100 to be used with the fuse holder 100, according to exemplary embodiments. Specifically, the busbar 1100 is to be used when the fuse holder 100 is to be stacked with other fuse holders, as illustrated variously in FIGS. 12A-12E. The busbar 1100 includes multiple apertures 1102. Cut locations 1104*a-c* are shown, as the busbar may have two apertures 1102, three apertures, four apertures, or five apertures, depending on the combination of stacked fuse holders 100.

Figure 12C:
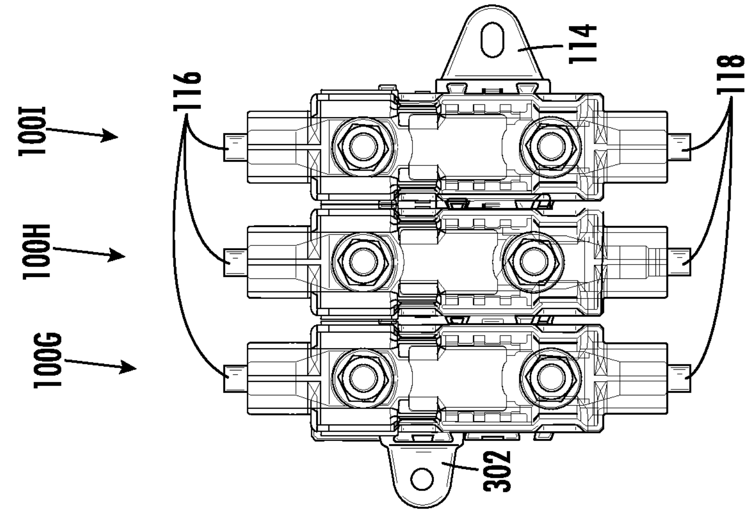
FIGS. 12A-12E are diagrams illustrating the fuse holder of FIGS. 1A-1C in stacked configurations, in accordance with exemplary embodiments.
Figure 12B:
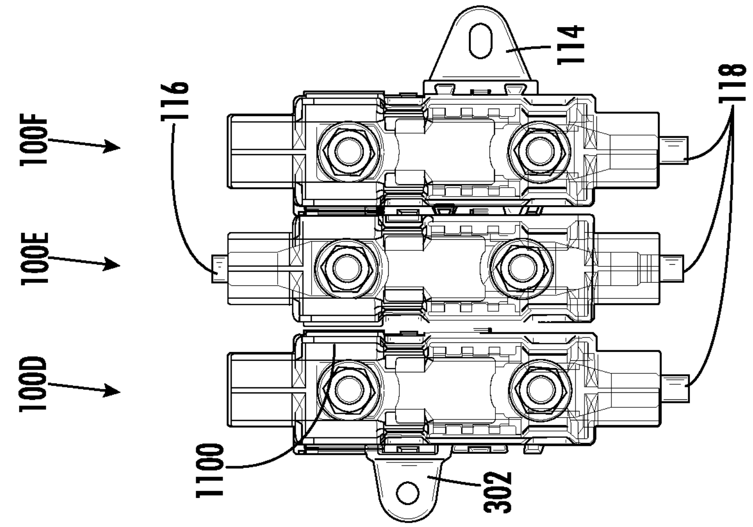
Figure 12A:
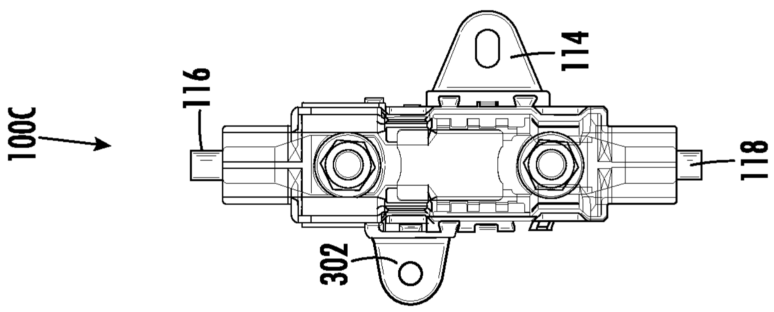
Figure 12D:
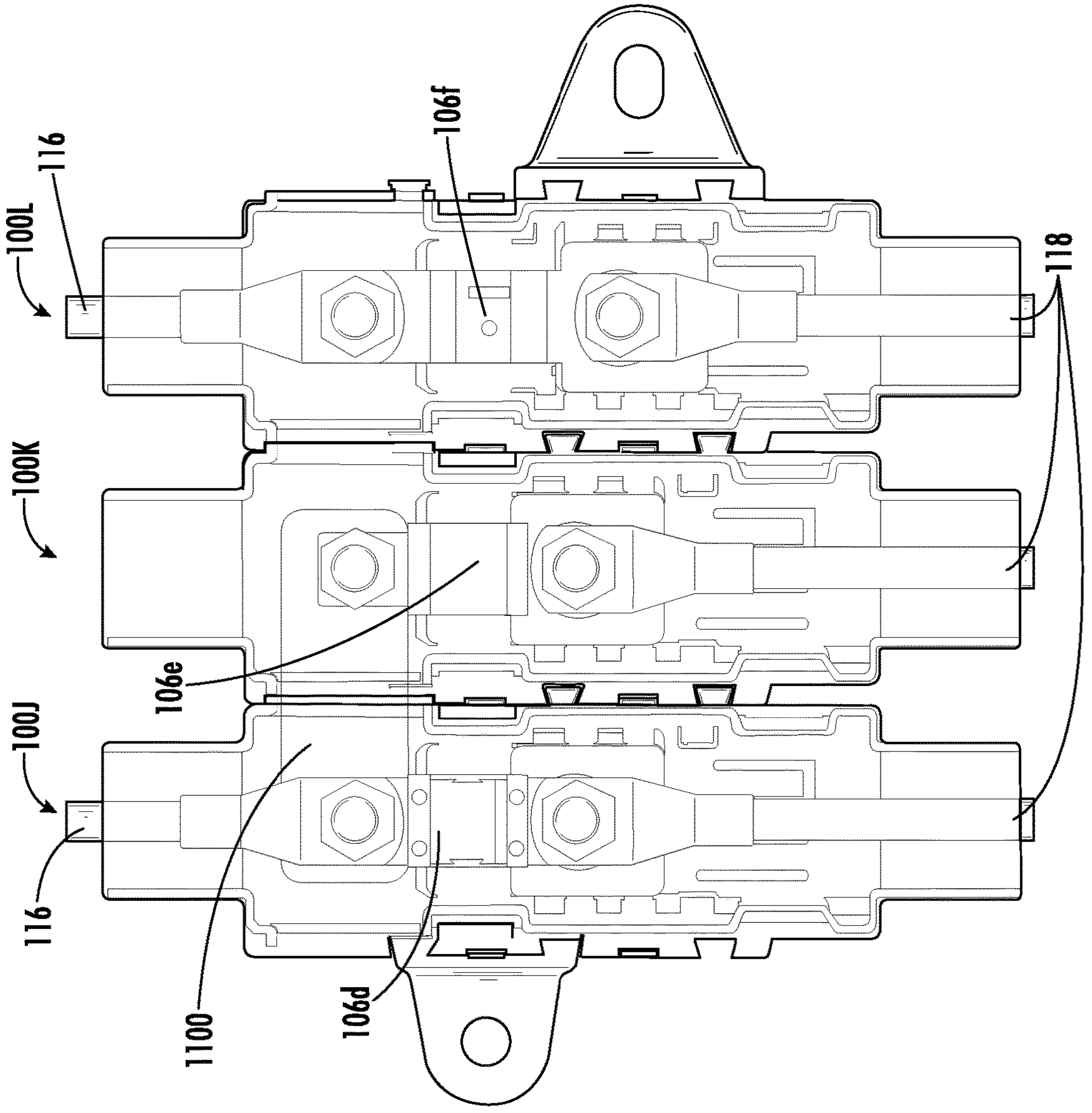
Figure 12E:
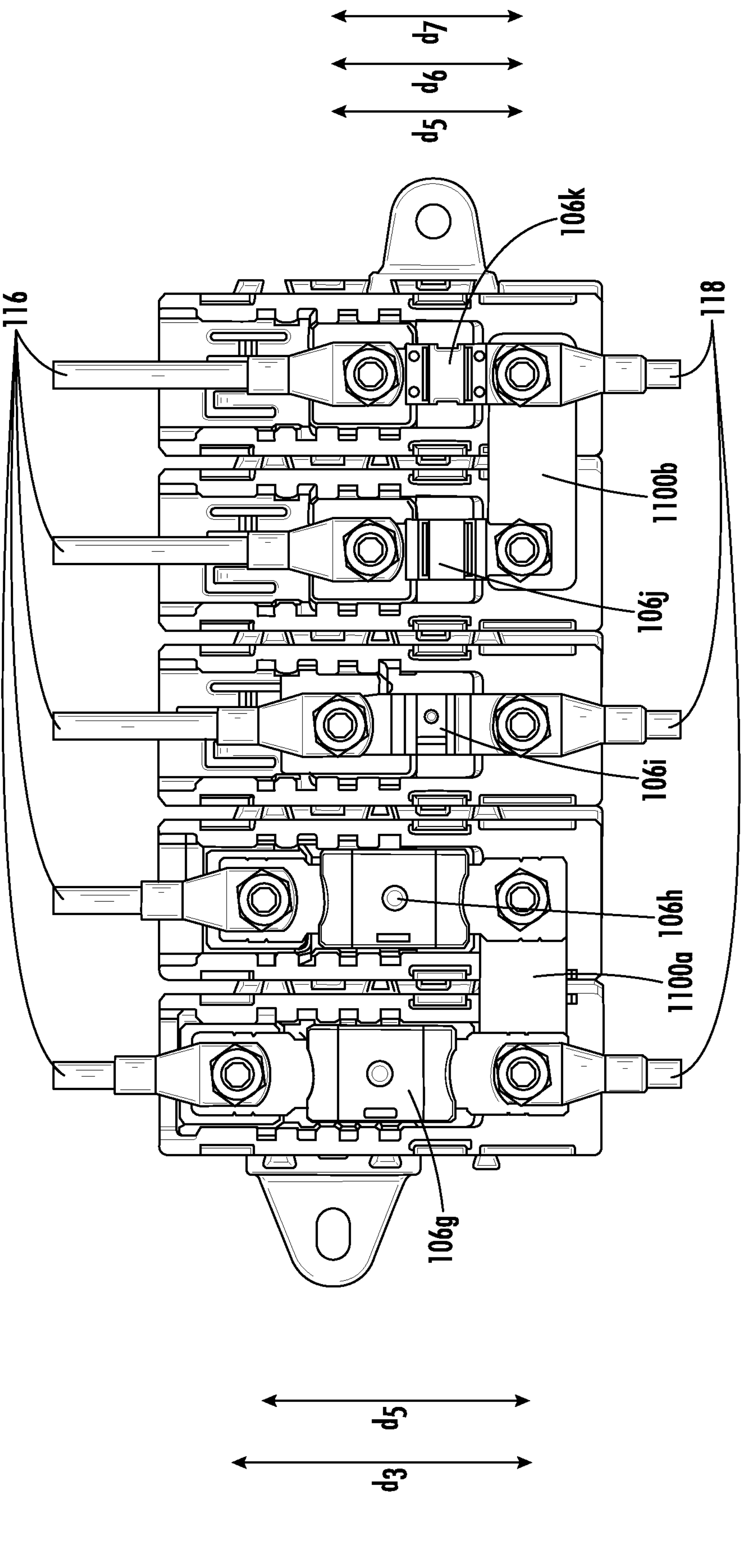

FIGS. 12A-12E are representative drawings of the fuse holder 100 shown in various stacked configurations, according to exemplary embodiments. FIG. 12A shows unstacked fuse holder 100C, FIG. 12B shows three stacked fuse holders 100D, 100E, and 100F, FIG. 12C shows three stacked fuse holders 100G, 100H, and 100L FIG. 12D shows three stacked fuse holders 100J, 100K, and 100L, and FIG. 12E shows five stacked fuse holders 100M, 100N, 100O, 100P, and 100Q. The illustrations show the versatility of the fuse holder 100 for customers having one or more bolt-down fuses.

The fuse holder 100C (FIG. 12A) is not stacked with other fuse holders. Mounting tabs 114 is disposed on one side of the fuse holder 100C and mounting tab 302 is disposed on the other side of the fuse holder. Cable 116 is connected at one end of the fuse holder 100C and cable 118 is connected at the other end. Using the mounting tabs 114 and 302, the fuse holder 100C may be secured to a surface.

The fuse holders 100D, 100E, and 100F form a stacked assembly of fuses (FIG. 12B). Mounting tabs 302 and 114 are sufficient to secure the stacked assembly, even though there are three fuse holders. Busbar 1100 is disposed between fuse holder 100D, 100E, and 100F, with the busbar being bolted by a stud from each fuse holder. The studs connected to the busbar 1100 may be the fixed studs (e.g., stud 110) or the movable studs (e.g., 112). Due to the presence of the busbar 1100, there is a single cable 116 on one side of the stacked assembly (the same side as the busbar) while there are three cables 118 extending from the three fuse holders 100D, 100E, and 100F.

The fuse holders 100G, 100H, and 100I form another stacked assembly of fuses (FIG. 12C). Mounting tabs 302 and 114 are sufficient to secure the stacked assembly, even though there are three fuse holders. There is no busbar connecting between the fuse holders 100G, 100H, and 100I. Therefore, there are three cables 116 on one side of the stacked assembly and there are three cables 118 on the other side of the stacked assembly, with one of each cable extending from each fuse holder 100G, 100H, and 100I.

The fuse holders 100J, 100K, and 100L form another stacked assembly of fuses (FIG. 12D). A busbar 1100 connects between the fuse holders 100J and 100K, but not to fuse holder 100L. Therefore, a single cable 116 is connected to one side of fuse holder 100J (but could alternately be connected to one side of fuse holder 100K), and a second cable 116 is connected to the fuse holder 100L on the same side. There are three cables 118 on the other side of the stacked assembly, with one of each cable extending from each fuse holder 100J, 100K, and 100L.

Fuse holder 100J holds a first fuse type 106*d*, fuse holder 100K holds a second fuse type 106*e*, and fuse holder 100L holds a third fuse type 106*f*. The three fuses 106*d*, 106*e*, and 106*f* may be of different sizes and have different voltage ratings. The fuse holder 100 can support different types, sizes, and ratings of linear bolt-down fuses.

In FIG. 12E, the fuse holder assembly consists of five different fuse holders 100M, 100N, 100O, 100P, and 100Q. Fuse holders 100M and 100N are connected by busbar 1100*a* and fuse holders 100P and 100Q are connected by busbar 1100*b*. Fuse holder 100M has fuse type 106*g*; fuse holder 100N has fuse type 106*h*; fuse holder 100O has fuse type 106*i*; fuse holder 100P has fuse type 106*j*; and fuse holder 100Q has fuse type 106*k*, where 106*g*≠106*h*≠106*i*≠106*j*≠106*k*. In fuse holder 100M, the distance between the fixed stud and the movable stud is $d_3$; in fuse holder 100N, the distance between the fixed stud and the movable stud is $d_4$; in fuse holder 100O, the distance between the fixed stud and the movable stud is $d_5$; in fuse holder 100P, the distance between the fixed stud and the movable stud is $d_6$; and in fuse holder 100Q, the distance between the fixed stud and the movable stud is $d_7$, where $d_3 \neq d_4 \neq d_5 \neq d_6 \neq d_7$. These illustrations demonstrate that the fuse holder 100 enables a stackable design that can provide much needed versatility for the customer, whether the fuses are stacked together or assembled via an in-line connection.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A fuse holder comprising:

a first stud to secure a first terminal of a bolt-down fuse;

a base upon which a second stud is affixed, the second stud to secure a second terminal of the bolt-down fuse, the base further comprising:

a first dovetail connector disposed on a first side of the base;

a first dovetail opening disposed adjacent the first dovetail connector on the first side of the base;

a first lock ramp disposed adjacent the first dovetail opening on the first side of the base;

a second dovetail connector disposed on a second side of the base;

a second dovetail opening disposed adjacent the second dovetail connector on the second side of the base; and a first lock ramp receiver disposed within the second dovetail connector.

2. The fuse holder of claim 1, wherein the first side of the base is coupled to a mounting tab.

3. The fuse holder of claim 2, wherein the mounting tab further comprises:

a third dovetail connector;

a third dovetail opening disposed adjacent to the third dovetail connector; and a second lock ramp receiver disposed adjacent the third dovetail connector.

4. The fuse holder of claim 3, wherein:

the first dovetail connector of the first side of the base couples to the third dovetail opening of the mounting tab;

the first dovetail opening of the first side of the base couples to the third dovetail connector of the mounting tab; and the first lock ramp of the first side of the base couples to the second lock ramp receiver of the mounting tab.

5. The fuse holder of claim 1, wherein the first side of the base is coupled to a second fuse holder.

6. The fuse holder of claim 1, wherein the second side of the base is coupled to a mounting tab.

7. The fuse holder of claim 6, wherein the mounting tab further comprises:

a third dovetail connector;

a third dovetail opening disposed adjacent the third dovetail connector; and a second lock ramp disposed within the third dovetail opening.

8. The fuse holder of claim 1, wherein the second side of the base is coupled to a second fuse holder.

9. The fuse holder of claim 1, further comprising:

a movable tab upon which the first stud is affixed.

10. The fuse holder of claim of claim 7, wherein:

the second dovetail connector of the second side of the base couples to the third dovetail opening of the mounting tab;

the second dovetail opening of the second side of the base coupled to the third dovetail connector of the mounting tab; and the first lock ramp receiver of the second side of the base couples to the second lock ramp of the mounting tab.

* * * * *